Figure 1:
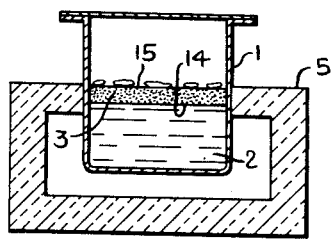

Dec. 21, 1954  P. WEISS  2,697,597
DEVICE FOR THE RECOVERY OF PURE ALUMINUM
Filed Sept. 21, 1951

INVENTOR.
PAUL WEISS
BY

HIS AGENTS.

United States Patent Office 2,697,597
Patented Dec. 21, 1954

2,697,597

DEVICE FOR THE RECOVERY OF PURE ALUMINUM

Paul Weiss, Grevenbroich, Germany, assignor to Vereinigte Aluminiumwerke A.-G., Bonn am Rhine, Germany, a German corporation Application September 21, 1951, Serial No. 247,629

Claims priority, application Germany September 22, 1950

1 Claim. (Cl. 266—15)

The invention relates to the recovery of pure aluminum from mixtures of aluminum containing materials with volatile aluminum components.

In the purification of aluminum containing materials by means of aluminum halogenides and particularly aluminum chloride vapors the reacting gases are generally conducted in a circular cycle. Considerable difficulties are hereby experienced with regard to the necessary heating and cooling devices in view of the high reaction temperature and the chemical attack of the reacting gases.

It is the main object of this invention to eliminate these drawbacks and difficulties.

It is also an object of the invention to replace the hitherto customary cycle reaction by a straight flow of the reacting gases and vapors.

The invention is based on the recognition that the above recited objects may be realized in a simple and efficient manner, if the one face thereof where the aluminum is taken up by the volatile reactant at a high temperature, and the face where the aluminum is condensed from the vaporous state at a lower temperature, are located oppositely to each other at a comparatively small distance and the metal exchange is caused by diffusion in replacement of the circulation of the reacting gases and vapors. It is, of course, necessary to maintain a suitable temperature difference between the two above referred to aluminum vapor entering and aluminum vapor condensing faces.

However, a great disadvantage is involved in this procedure and this consists of the excessive heat losses and in the danger of a reunion of the crude and purified metal.

In order to render the above recited procedure practicable and efficient, a gas pervious partition of chemically and thermally resistant materials is located above the surface of the molten impure aluminum containing melt, this partition forming an aluminum separating layer.

For practical purposes, a loose gas pervious layer or diaphragm of granular, chemically inert materials of a lower heat conductivity and lower diffusion resistance is located upon the impure aluminum melt.

This layer may consist of loose pulverulent or fine materials, such as alumina or magnesium oxide, which are substantially inert to the influence of aluminum and aluminum halogenides. This layer may be applied as a coherent gas pervious body. The further advantage is hereby gained that the heat exchange by radiation and convection between the aluminum receiving and the aluminum separating faces is greatly reduced. On the other hand, by the use of a poorly heat conductive layer an assurance is obtained that the temperature reduction required for the condensation of the pure aluminum vapors is fully secured.

The natural heat decrease from the impure aluminum melt towards the surrounding atmosphere generally suffices to obtain the required temperature difference within the gas pervious partition and a cooling device will only be required, if very large installations are used.

A special aluminum depositing means need not be applied, since the outside face of the porous layer satisfactorily serves the purpose of aluminum condensation and separation, if it is kept at a lower temperature than the surface of the impure aluminum melt.

A reunion of the separated pure aluminum and the impure metal melt through the gas pervious partition is prevented by the high surface tension of the molten metal.

Gas pervious partitions constructed in conformity with the invention, are by way of example illustrated in the attached drawings.

In these drawings

Figs. 1, 2, 3, 4 show vertical sectional views of these gas pervious partitions.

In conformity with the embodiment shown in Fig. 1, the lower portion of a reaction vessel 1 is surrounded and heated by a furnace 5. An impure aluminum containing melt 2 is located in the bottom portion of this vessel; aluminum chloride is added to the melt and fills the space above the same.

A partition 3 consisting of alumina powder is located on top of the aluminum melt 2; consequently, the upper or outside face 15 of the partition 3 is cooler than its lower face 14, which is in contact with the melt; a decrease of the temperature takes place within layer 3 in an upward direction. The reaction vessel 1 is airtightly closed.

The aluminum enriched aluminum chloride vapors produced by the reaction within the melt enter the lower face 14 of the porous alumina partition 3, ascend through the same, and are thereby cooled; the purified aluminum metal vapors are condensed on the outside face 15 of partition 3 to form the aluminum bodies; the outside layer 15 lies opposite to face 14 in the flow direction of the aluminum vapors.

Figure 2:
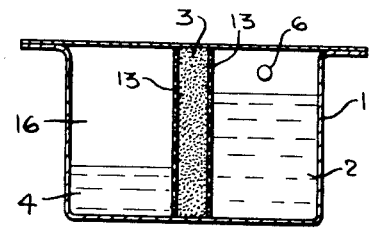

In the embodiment of the invention shown in Fig. 2, a closed reaction vessel 1 is shown, which is separated into two chambers 2 and 16 by a porous vertical wall consisting of a partition of pulverulent materials which are inert to the aluminum vapors and may consist of alumina, silica or clay powders; this layer is encased between two perforated lateral walls 13.

An impure aluminum containing charge in admixture with an aluminum halogenide, such as particularly chloride or fluoride, is held in the right chamber 2 in the molten state by means of a heat produced from a current carrying graphite rod 6. The mixture of aluminum and aluminum halogenide vapors produced by the reaction with the aluminum halogenide in the hot impure aluminum containing melt flows through the wall 3 and the aluminum is condensed and collected in the sump 4 of the cooler chamber 16.

Figure 3:
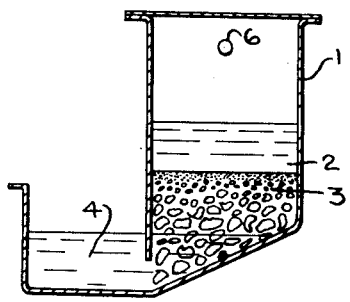

In conformity with Fig. 3, the aluminum containing crude melt 2 is located in an airtight chamber 1 above the gas pervious partition 3. Also in this case, the reacting mixture of the aluminum containing charge and of the aluminum halogenide is held in the molten state by the heat produced from a current conductive graphite rod 6. The vapor pervious partition 3 consists of chemically inert and heat resistant particles which increase in size in a downward direction. The vapors produced by the reaction of the aluminum containing melt with the aluminum halogenide flow downwardly and fill the spaces of the porous partition 3. The thus produced pure aluminum is condensed in the lower portion of the partition 3, which is cooled by the surrounding atmosphere, whereas the melt and the upper portion of the partition 3 is heated. The condensed aluminum is collected in sump 4.

As already stated, this process must be performed in an airtightly closed vessel, because the oxygen as well as the nitrogen would react at the reaction temperature of the process with these gases. Since the process may be carried out at a lower or higher than normal pressure, it should be performed in a gas-tight steel vessel, which is provided on the inside with a heat insulating and chemically resistant coating, preferably consisting of alumina containing materials.

To avoid heat losses this insulating layer should be made as thick as possible in order to have a low temperature on the outside of the layer. Since, however, insulating materials are generally gas permeable, it is unavoidable that at the inside a partial condensation may take place of the reactants, whereby considerable pressure variations may result.

In order to eliminate this disadvantage, the gas-tight outside wall of the reaction vessel is maintained at a temperature, which is higher than the evaporation or sublimation temperature of the aluminum halogenides or the aluminum sub-compounds produced in the reaction; the same refers to tubes attached to the outer wall and connected to the inner part of the reaction vessel.

An external temperature increase of the outer wall of the reaction vessel may be obtained by dimensioning the inner coating of said vessel in such a manner that a sufficient heating is effected from the inside; however, in this manner, an undesirably great quantity of heat will be lost by outside radiation.

The above recited purposes are best served by the addition to the inner heat insulation coating of a similar heat insulating layer applied to the outside of the reaction vessel. In this manner, an assurance will be obtained, that the vapors of the reacting halogenides do not condense on the gas-tight external coating; on the other hand, a considerable reduction will be achieved of the total heat economy of the plant.

It is, of course, possible to heat the gas-tight wall of the reaction vessel to the desired temperature by additional heating means.

Figure 4:
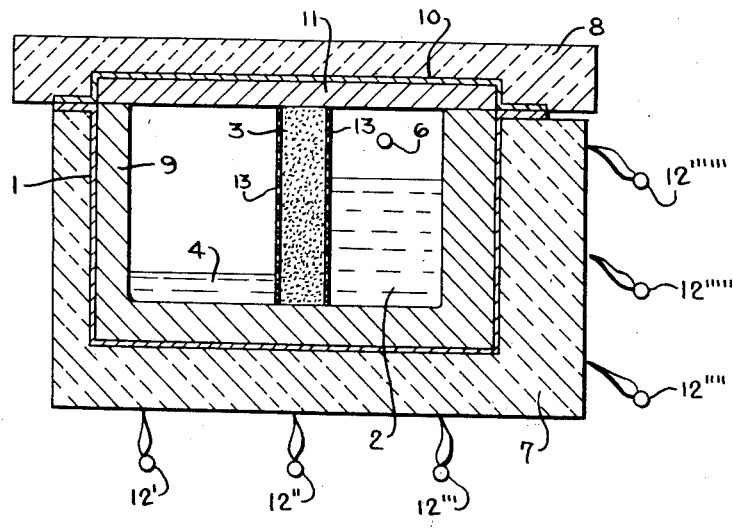

An embodiment of the invention, where these operative conditions are properly considered, is shown in Fig. 4.

The outer wall of the reaction vessel 1, consisting of steel, is coated with inner alumina containing layer 9. A vertical porous partition 3, as also shown in Fig. 2, is located in vessel 1. The impure aluminum is charged into the right chamber 2; an electrically heated graphite rod 6 is provided in this chamber.

In the left chamber 4 the pure aluminum is condensed. The inner space of the reaction vessel is filled with aluminum chloride vapors. The reaction vessel is protected against heat loss by an outer insulating layer 7, in such a manner, that the temperature of the wall of the reaction vessel 1 may not be reduced to less than 200° C. The same is true of cover 10, which is provided with an inner coating 11 and an outer insulation 8. A number of gas burners $12^1$—$12^{111111}$ are located at the outside of the vessel. The outer insulation 7 may eventually be omitted entirely or partly, if outer heating is applied. On the left side of the reaction vessel, the thickness of the inner as well as the outer insulation may be reduced in order to maintain the temperature gradient required for the reaction in the inner space of the reaction vessel.

It will be apparent to those skilled in the art that the novel principles of the invention disclosed herein in connection with specific exemplifications thereof will suggest various other modifications and applications of the same. It is accordingly desired that in construing the breadth of the appended claim, it shall not be limited to the specific exemplifications of the invention described herein.

Having thus described the invention, what I claim as new and desire to be secured by Letters Patent, is as follows:

A device for the recovery of pure aluminum from a material mixture consisting of impure aluminum and of an aluminum halogenide said device comprising a substantially rectangular air-tightly closed steel vessel, an upper cover applied to said vessel, said vessel and said cover having an inner alumina lining, the vessel being completely closed by an outer heat insulating casing, a vertical heat resistant partition in said vessel dividing the same into two compartments of a substantially equal holding capacity, said partition consisting of a gas pervious layer of a chemically and heat resisting material which is inert to the action of aluminum vapours, one of said compartments to receive the mixture of the impure aluminum and of the aluminum halogenide being provided with a current conductive graphite heating rod to heat the mixture and to volatilize the aluminum, said partition forming a cooling passage for the aluminum vapours transiting through said partition from said mixture receiving into said other compartment.

References Cited in the file of this patent

UNITED STATES PATENTS

| Number | Name | Date |
|---|---|---|
| 1,080,866 | Thompson | Dec. 9, 1913 |
| 1,085,712 | Vadner | Feb. 3, 1914 |
| 1,914,484 | Bunce | June 20, 1933 |
| 1,994,346 | Holstein | Mar. 12, 1935 |
| 2,065,709 | Kemmer | Dec. 29, 1936 |
| 2,433,434 | Church | Dec. 30, 1947 |
| 2,470,305 | Gross | May 17, 1949 |
| 2,513,339 | Loevenstein | July 4, 1950 |